Aug. 1, 1961  J. A. NORTHCOTE ET AL  2,994,174
ROTARY MOWER

Filed Nov. 25, 1957  4 Sheets-Sheet 1

FIG. I

INVENTORS.
JOHN A. NORTHCOTE
JOHN KULAK

ATTORNEYS

United States Patent Office 2,994,174
Patented Aug. 1, 1961

2,994,174
ROTARY MOWER
John A. Northcote, Welland, Ontario, and John Kulak, Port Colborne, Ontario, Canada, assignors to John Deere Plow Company (Limited), Winnipeg, Manitoba, Canada, a corporation of Canada
Filed Nov. 25, 1957, Ser. No. 698,843
8 Claims. (Cl. 56—25.4)

The present invention relates generally to agricultural implements and more particularly to tractor-operated rotary mowers or stalk shredders and like implements.

The object and general nature of the present invention is the provision of a new and improved rotary mower or stalk shredder in which the casing or housing of the mower is particularly constructed to accommodate the connection of the rotor with the power take-off shaft of a farm tractor. More specifically, it is a feature of this invention to provide a rotary mower in which new and improved hitch means is provided so that the mower may be readily adapted to be towed behind a farm tractor, or supported in integral relation on the tractor, as desired, and another feature of this invention is the provision of hitch means accommodating a floating action when the implement is connected in integral relation with the tractor.

A further feature of this invention is the provision of a rotary mower for farm and similar use wherein supporting wheels may be disposed optionally in forward or rearward positions, with new and improved ram-connecting means and associated lock-up means, accommodating removal of the ram, when desired. In this connection, it is a further feature of this invention to provide a ram-connecting means so constructed and arranged that, whether the wheels are arranged in forward or rearward positions, the extending stroke, which is the more effective, is utilized to raise the implement.

These and other objects and advantages of the present invention will be apparent to those skilled in the art after a consideration of the following detailed description, taken in conjunction with the accompanying drawings, in which:

FIG. 5 is a fragmentary detail view of the upper portion of the mast section of the implement.

FIG. 6 is a fragmentary perspective view of a further modified form of the present invention, in which the center rear wheel, shown in FIG. 1, has been replaced by a rockable axle carrying two rear wheels, the implement being further modified by the provision of a hitch to accommodate connecting the implement in trailing relation to the drawbar of a tractor.

FIG. 7 is an enlarged fragmentary view of the upper rear portion of the implement, showing in particular the lock-up means for holding the rear wheels and axle member or rockshaft in a transport position.

FIG. 8 is a sectional view illustrating another position of the parts shown in FIG. 5.

Figure 1:
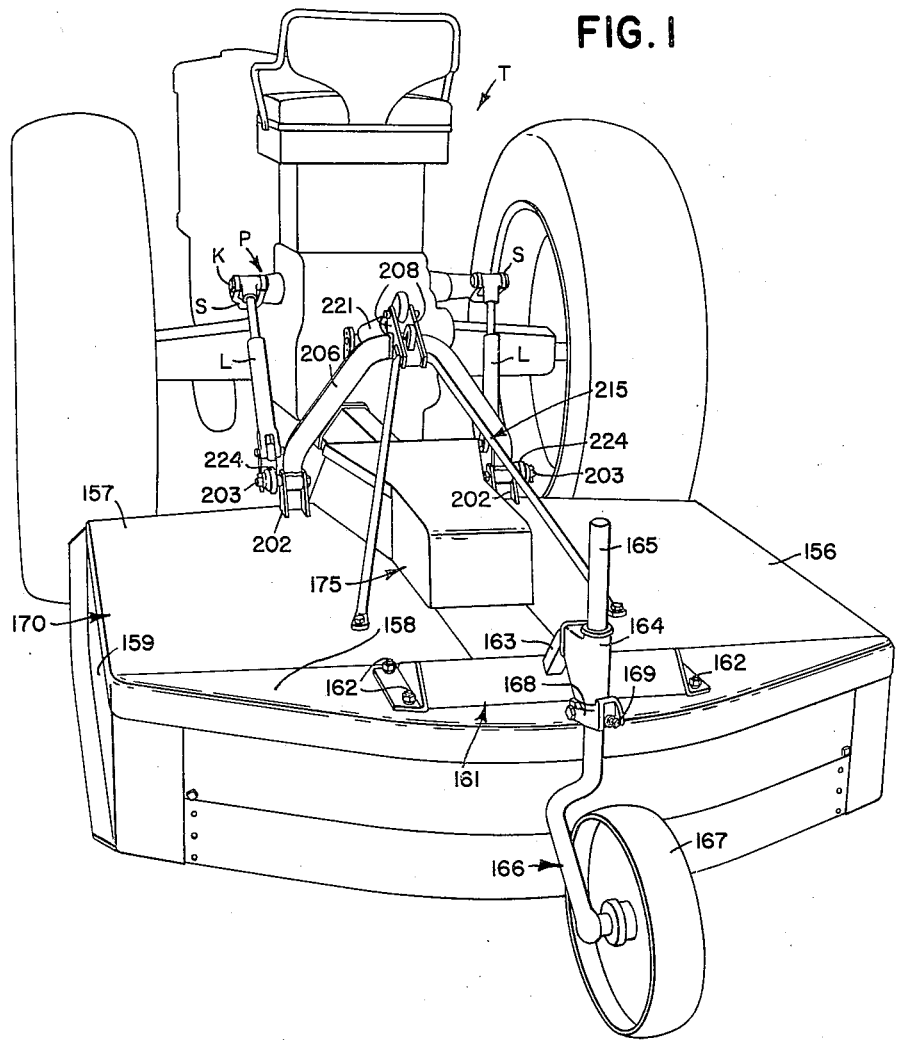
FIG. 1 is a perspective rear view of the stalk shredder or rotary mower in which the principles of the present invention have been incorporated.

The preferred form of the present invention, as illustrated in the accompanying drawings, is particularly adapted to be incorporated into either an integral or tractor supported implement or in a towed ground-supported implement. Referring first to FIG. 2, the implement shown therein is generally similar to the rotary mower described and claimed in the copending application, Ser. No. 453,453, filed September 1, 1954, by John A. Northcote and David W. Dixon, for Rotary Mower, now U.S. Patent 2,815,631, issued December 10, 1957, in that the implement includes a framework 150 that comprises, among other members, a pair of front transverse members, which may be in the form of angles 151 and 152, and curved bottom members or angles 153 and 154, to which framework upper sheets 156, 157 and 158 are connected, the sheets 156 and 157 including or carrying downwardly extending side sections 159. Connected to the framework 150, generally at the rear thereof, is an attaching bracket 161 (FIG. 1) connected, as by bolts 162, to the rear portion of the mower housing and having an upwardly and rearwardly extending bar 163 carrying a vertically disposed sleeve 164 in which the shank 165 of the rear caster wheel unit 166 is disposed. The latter unit includes a castering ground engaging supporting wheel 167. A coller 168, connected adjustably to the shank 165 by set screw means 169, engages a lower flange on the sleeve 164 for the purpose of retaining the ground wheel 167 in the proper position vertically while accommodating castering action.

The mower housing or casing, indicated generally at 170 and which is made up of the framework 150 and the associated sheets or plates, encloses a rotor 172 (FIG. 2) carrying shredding or cutting knives 173. The rotor 172 is disposed and supported in about the same way as shown in the above mentioned patent, being driven by suitable bevel gear means disposed within an auxiliary housing section 175 carried on the casing 170 and to which a drive shaft 176 extends. The drive shaft means 176 includes universal joint means 177 that is adapted to be connected to the power take-off shaft of the tractor indicated generally at T in FIG. 6.

In order to receive the drive shaft 176 and associated parts, and to protect the same against cuttings and other material shredded by the knives 173, the housing 170 at its forward end includes downwardly converging side sections 181 and 182 and a cooperating bottom section 183, these sections being arranged to diverge forwardly in drive shaft embracing relation. The framework 150 includes a generally U-shaped bar 184, welded at its extremities to the laterally inner portions of the frame members 151 and 152. As best shown in FIG. 2, the lower portion of the bar 184 receives an angle support 186 to which the stationary knife bars 187 are connected, as indicated at 188. Cooperating with the forwardly diverging wall portions or plates 181 and 182 is an upper shaft-embracing enclosure 191 that is made up of a top section 192 and two side sections 193 and 194 suitably connected together, the side walls 193 and 194 being constructed so as to diverge forwardly and cooperate with the lower wall sections 181, 182 and 183 to form a tunnel-like enclosure for the drive shaft 176. The unit 175 is hingedly connected with the casing 170 by any suitable hinge means.

Figure 2:
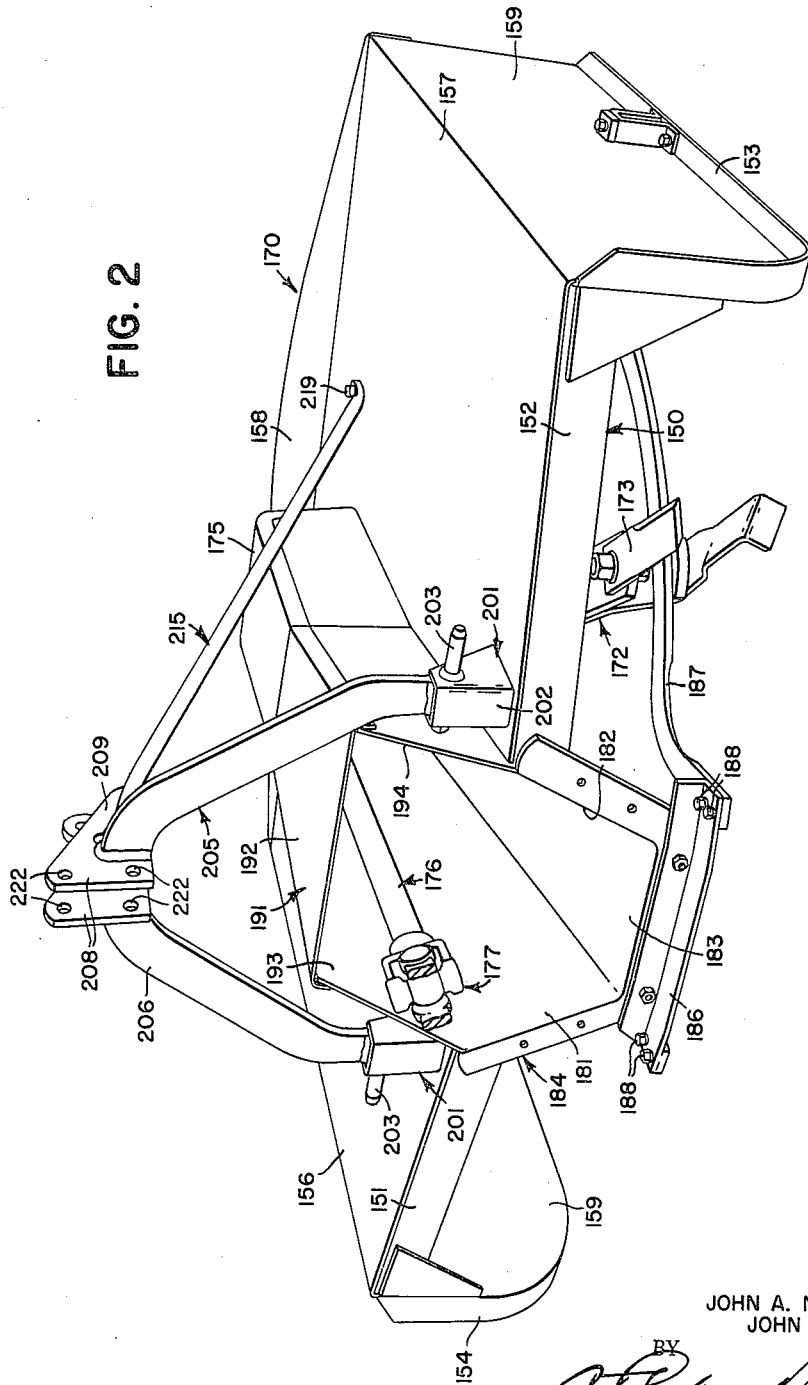
FIG. 2 is a perspective view of the mower casing or frame, incorporated in the implement shown in FIG. 1, certain parts being omitted.

In the form of the invention shown in FIGS. 1 and 2, the housing or casing 170 carries a pair of forwardly disposed draft-link receiving brackets 201. Each of these parts is made up of a U-shaped support 202 and a draft pin 203 that extends laterally outwardly from each support 202. Each pin 203 also extends laterally inwardly of the support 202 so that a portion of the pin may serve as a hinge pintle to receive the lower portions of the generally vertically disposed mast section 205 which preferably is in the form of a V-shaped bar 206 that at its upper or apical portion carries a pair of apertured plates 208 that are of particular formation. The plates 208 have rearwardly extending slotted portions 209 (FIG. 5) maintained in spaced apart relation by a U-shaped spacer having upper and lower web sections 211 and 212. The latter sections have apertures 207 and 210 to receive a U-shaped draft pin 213 that may be disposed in two optional positions, as will be referred to later. The mast structure 205 is hinged on the above-mentioned pintle sections 203 and may therefore swing in a generally fore-and-aft direction relative to the mower casing or housing 170 when permitted. A V-shaped brace 215, having its upper end or apical portion disposed forwardly and received within the slots 216, includes leg portions 217 and 218 secured by bolts 219 to the upper or top side of the housing 170. When the pin 213 is disposed in apertures 210 (FIG. 8) to prevent movement of the upper end of the V-shaped brace 215 relative to the mast section 205, the latter is connected rigidly with the mower housing, but when the pin 213 is disposed in the forward openings 207 (FIG. 5) in the webs 211 and 212, the upper portion of the mast structure 205 may pivot in a generally fore-and-aft direction relative to the associated brace 215. When the implement is used as an integral or tractor mounted machine, the upper draft link 221 is pivotally connected in one of the pairs of openings 222 in the forward portions of the plates 208, and the lower draft links 224 of the tractor T are connected by universal connectors with the laterally extending pins 203.

In operation, the universal joint 177 will be connected to the power take-off shaft of the tractor, and the power lift mechanism P (FIG. 1) of the tractor may be utilized for raising and lowering the implement into and out of transport and working positions, the tunnel-like wall sections 181, 182, 183, 192, 193 and 194 accommodating the swinging of the shaft 176 as the implement is raised and lowered. Ordinarily, when utilized as an integral tractor carried machine, the weight of the latter will be carried on the rear ground wheel 167 and on the draft links 224, the latter being supported by lift links L from the arms K on the power lift rockshaft K having bifurcated sections S receiving the upper ends of the left links L, as best shown in FIG. 1. To accommodate movement of the outfit over uneven terrain, the pin 213 will be disposed in associated forward holes 207, so as to accommodate some movement of the brace 215 in the slots 216, thereby providing the floating action which permits the rear end of the implement to rise and fall relative to the tractor, particularly as the front end of the latter passes through swales or over ridges or the like during operation of the implement. In this way, the cutting or shredding knives 173 operate generally in a plane that is approximately parallel to the ground over which the outfit it drawn. The height of operation is controlled by fixing the standard 165 in different vertical positions in the sleeve section 164 and by appropriately raising or lowering the draft links 224 of the tractor.

Figure 3:
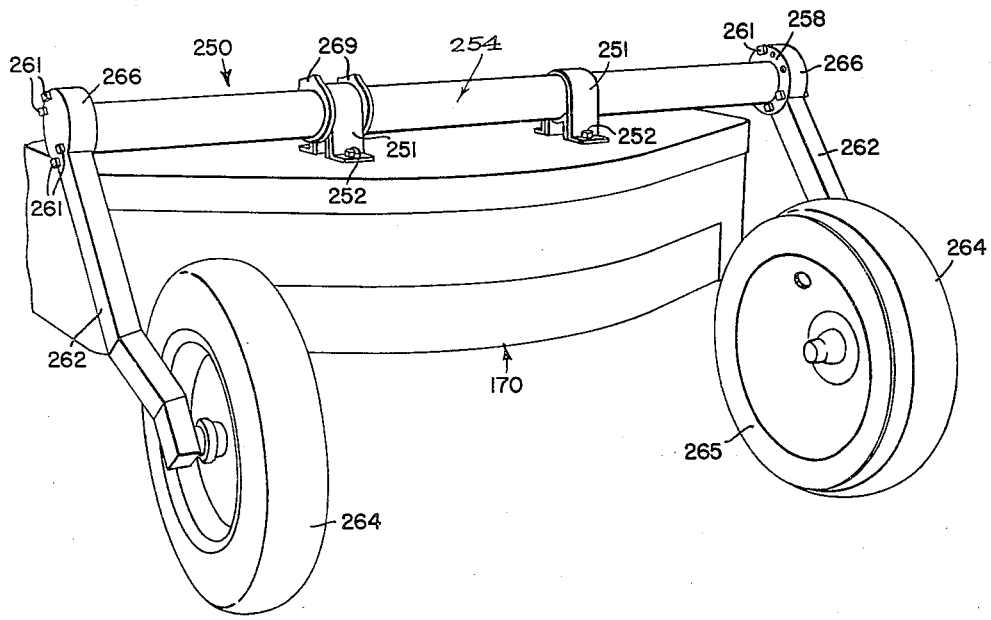
FIG. 3 is a fragmentary rear perspective view of a modified form of rear support employing two rear wheels, showing the rear wheels in a rearward position.

The form of the invention shown in FIGS. 1 and 2 may readily be adapted for use as a towed implement with the addition of another type of ground wheel support, substituted for the rear wheel 167 and associated mounting parts, and with the addition of certain hitch parts so as to dispose the implement somewhat farther in rear of the tractor than the arrangement shown in FIG. 3.

Figure 4:
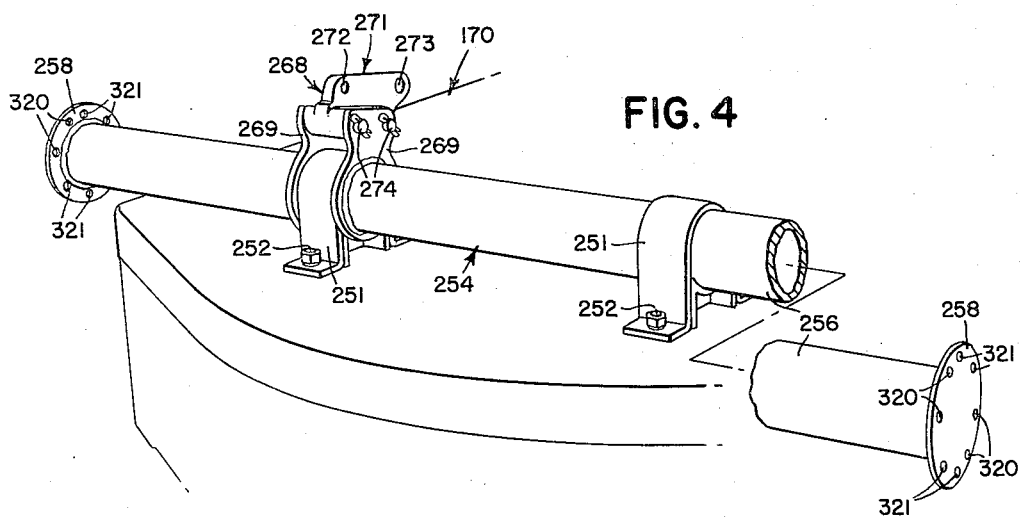
FIG. 4 is a fragmentary perspective view of the wheel support arrangement shown in FIG. 3, showing certain details of the wheel axle and associated parts.

Referring now to FIGS. 4, 6 and 7 the ground wheel means shown in FIG. 1 may be removed and replaced by the ground wheel means that is indicated in FIG. 6 by the reference numeral 250. This unit comprises a pair of bearing brackets 251 secured in any suitable way, as by bolts 252, to the upper rear portion of the housing 170. The brackets 251 rockably receive a transverse rockshaft 254, preferably in the form of a pipe member 256, each end having a flange 258 secured to the outer end thereof, with each flange being provided with a plurality of apertures to receive fastening bolts 261 by which a pair of wheel arms 262 may be connected to the rockshaft 254 in either of two positions, one with the wheel arms extending downwardly and rearwardly, as shown in FIG. 3, or with the wheel arms extending downwardly and forwardly, as shown in FIG. 7. Journaled on the lower end of each of the wheel arms 262 is a ground engaging wheel 264. One of the wheels 264 carries a disk 265 (FIG. 3) that has a diameter almost equal to the diameter of the wheel, the purpose of the disk 265 being to protect the tire from objects thrown in that direction by the cutting unit 172. The upper end of each wheel arm 262 is embraced by and carries an axle cap 266. An actuating arm unit 268 is connected to the rockshaft 254 and comprises two parts 269 and an associated cylinder-receiving casting 271 (FIG. 4) that is apertured, as at 272 and 273, and also further apertured to receive a pair of connecting pins 274 by which the casting is connected to the arm sections 269. The two parts 269 are spaced so as to receive the associated bearing bracket 251 therebetween. Thus, the parts 269 act to hold the rockshaft 254 against axial displacement on the mower housing. A bracket member 275 is pivotally connected, as at 276 (FIG. 7), with the forward apertured portion 273 of the arm 268, and the bracket 275 is provided with rear apertures adapted to receive a quick detachable pin 278 when the rear apertures of the part 275 line up with the rear aperture 272 of the arm casting 271. A hydraulic cylinder 280 is adapted to be anchored to the mower housing 170 by means of a bracket 281 that is mounted on the mower housing alongside the tunnel section 191. The bracket 281 is provided with an apertured lug 282 by which the forward end of the unit 280 is releasably connected with the mower housing. The other end of the unit 280 is provided with a connecting pin 283 that is adapted to be inserted in the upper apertured end of an arm 284 that is swingably mounted on a pin 285 carried in the bracket 275. In one position (FIG. 7), the arm 284 lies against the upper rear portion of the bracket 275, and when the hydraulic unit 280 is extended, the arm 268 is rocked in a rearward direction so that, if the ground wheels 264 are disposed rearward, as shown in FIG. 6, the mower is raised. The extension of the ram unit 280 is commonly referred to as the power stroke, since somewhat less power is available on the retracting stroke. The power unit 280 is removable from the mower, as is customary in a remote control implement. In order to hold the ground wheels in a position for transport, a strut unit 290 is provided to connect between the bracket 281 and the bracket 275 so as to anchor and hold the rockshaft 254 against rocking movement either in one direction or the other. The strut 290 consists of a forward section 291 connected by a pin 292 (FIG. 7) to the lower portion of the bracket 281. The rear portion of the strut 290 is formed by a pair of yoke sections 294 the rear portion of each of which is apertured to receive the pin 285. The yoke sections 294 are shaped to form a sleeve member 295 in which the rear end of the forward section 291 is slidable. The sleeve section 295 and the rear end of the forward section 291 are apertured to receive a quick detachable pin 296, the latter being insertable into the above-mentioned openings when the latter are in alignment, which occurs when, as shown in FIG. 6, the power unit or ram 280 has been extended to swing the inwardly disposed wheels 264 downwardly to raise the implement into a transport position. The opening in the sleeve 295 is indicated at 322 in FIG. 6. The pin 296 may then be freely inserted into the registering openings, as a result of which the strut or link 290 acts to hold the ground wheels in their lowered or transport position, and this permits the ram unit 280 to be removed from the implement, as by taking out the pin 283 and the pin at the forward end of the ram 280, which pin connects the ram unit to the lug 282 (FIG. 7). FIG. 7 shows the strut 290 in its holding position with the ram 280 removed.

When the implement is carried on the ground wheels 264, as shown in FIG. 6, it is necessary to provide a hitch connection between the front of the implement and the tractor so that the weight of the implement and associated parts is divided more or less between the rear ground wheels 264 and the point of connection of the hitch structure with the tractor.

Referring now to FIGS. 6 and 8, it will be seen that the mast section or yoke 205, which normally is capable of pivoting freely (FIG. 5) through a limited extent relative to the mower housing, rigidly receives a hitch structure 300, and to hold the yoke 205 rigid with the mower casing, the pin 213 is removed from the forward openings 207 (FIG. 5) in the webs 211 and 212 and reversed so that the longer section 213a is disposed in the rear openings 210, as shown in FIG. 8. By virtue of this arrangement the longer section 213a of the pin 213 contacts the forward end of the brace 215 and thus prevents any movement of the latter in the slots 216 of the mast section 205. A detent 213b holds the pin 213 in place.

The hitch structure 300 includes a lower pair of draft members 301 having their rear ends formed to pivotally receive the pins 203. The forward ends of the hitch members 301 are interconnected by a yoke 303 that is detachably connected, as at 304, with the drawbar 305 of the associated tractor. The lower members 301 are held against vertical swinging relative to the mower by means of a strut 307 that includes a U-shaped member 308 the lower or bight portion of which is swingably received in a pair of U-bolts 308 or other suitable means. The rear or upper ends of the U-shaped strut member 308 are fixed to connecting plates 309 in which a trunnion 311 is carried. The trunnion is screw-threaded and receives the lower threaded portion of an adjusting rod 312 to which a wheel 313 is connected. The upper end of the screw-threaded member 312 is rotatably anchored in a part 314 that is releasably engageable with the plates 208 by means of a pin 315 that is passed through the openings 222 in the plates 208 (FIG. 5). As shown in FIG. 6, the hitch structure 300 provides means for rigidly connecting the forward end of the mower to and supporting the forward portions of the implement on the tractor drawbar 305. By turning the hand wheel 313 in one direction or the other, the effective length of the strut 307 is varied so as to raise or lower the front end of the draft members 301 relative to the implement, thus raising or lowering the cutting knives relative to the surface of the ground. When the ram or power cylinder 280 is mounted in place (FIG. 6) and the lock-up pin 296 (FIG. 7) removed (FIG. 6), the tractor power lift system may be actuated to raise or lower the ground wheels 264 and thus raise and lower the rear position of the cutting knives. Thus, the cutting elements may be adjusted to operate in a plane parallel to the surface of the ground. As will be seen from FIG. 7, the pin 283 (FIG. 6) that normally connects the piston rod section of the power cylinder unit 280 to the swingable arm 284 is disposable in the opening 321a (FIG. 7) in the upper end of the arm 284. Also, the sleeve section 295 mentioned above is provided with two openings 322 (FIG. 6), one at each side of the sleeve section 295, to register with the opening in the rear end of the link 291 and thus receive the lock-up pin 296.

When the ground wheels 264 are disposed in a rearward position, as shown in FIG. 6, two optional wheel spacings are available. For example, as shown in FIGS. 3 and 6, the wheel arms 262 may be fastened to the flanges 258 so that the wheels 264 are disposed at the laterally inner sides thereof and fairly well behind the mower housing 170. However, by reversing the arms 262 so as to dispose the wheels 264 laterally outwardly of the arms 262, which may readily be done by removing the bolts 261, FIGS. 6 and 7, reversing the arms 262 and reattaching the latter to the rockshaft flanges 258. This disposes the wheels in a wider setting, which may be desirable to match the wheel spacing with the plant row spacing in cases where the implement is used to disintegrate plants growing in rows. The wheels in their rearward position and in their narrow spacing are shown more or less fragmentarily in FIG. 3. To place the wheels in their wider spacing arrangement and also in a forward position alongside the casing or housing 170, all that is necessary to do is to raise the mower, support the same temporarily, and then raise the wheels 264 off the ground, after which the bolts 261 may be taken out and the wheel arms 262 removed. The wheel units may then be turned around and then reattached in a forward position, as shown in dotted lines, FIG. 6, so that the wheels 264 lie outside the arms 262. To this end, as best shown in FIG. 4, each flange 258 has pairs of openings 320 to receive the bolts 261 when the arms 262 are disposed downwardly and rearwardly, and another set of openings 321 (FIG. 4) to receive the bolts 261 in the forwardly disposed positions of the arms 262.

It will be observed from FIG. 6 that when the wheels 264 are disposed in a rearward position, extension of the power unit 280, with the part 275 locked by the pins 276 and 278 to the casting 271, the wheels 264 will be swung downwarly and forwardly, thus raising the mower into a transport position. However, when the wheels are disposed in a forward position (dotted lines), the unit 280, connected as shown in FIG. 6, would have to be retracted to swing the wheels 265 downwardly and rearwardly to raise the mower. This is not the most effective stroke of the unit 280 since the effective cross section is reduced by the diameter of the piston rod, shown at 280a in FIG. 6. Therefore, according to the principles of the present invention, we provide means whereby the unit 280 may be extended, rather than retracted, to swing the wheels 264 downwardly and rearwardly to raise the implement when the wheels are positioned as shown in dotted lines in FIG. 6. This rearrangement of the connections between the power unit 280 and the rockshaft 254 is made in the following manner.

Referring first to FIG. 6, it will be observed that the part 275 is connected directly and rigidly to the arm 268 when both pins 276 and 278 are in place, as in FIG. 7. When the wheels are disposed forwardly (dotted lines, FIG. 6), by taking out the pin 278 and by inserting it, or the pin 296, in the openings 322, which may readily be done when the ram unit 280 is fully extended, the link 290 may be employed as a fulcrum to secure the motion reversal necessary so that extension of the unit 280 is now effective to swing the wheel arms 262 downwardly and rearwardly (dotted lines, FIG. 6) and lower the wheels 264 from their forward position, thus raising the implement when the power unit 280 is extended. This arrangement also has the advantage that at any time, regardless of the disposition of the wheels 264, whether forwardly or rearwardly, the unit 280 may be extended fully, the pressure being taken between the arm 284 and the part 275, so that the pins 278 and/or 296 may be removed or inserted, as desired. Also a pin 330 (FIG. 6) locking the arm 284 to the part 275 may be inserted in an opening 331 (FIG. 7) in the part 275 and a registering opening in the arm 284, as desired. When the pin 330 is removed the arm 284 is free to swing forwardly, thus facilitating the disconnection and removal of the power unit 280, which normally is a part of the tractor.

The bracket 281 includes a base 333, a part 334 carrying the lug 282 and having a slot receiving an adjusting nut 335 threaded on an anchor rod 336 pivoted on the base 333 by a pin 337. The nut is held in a position of adjustment by a set screw 338.

While we have shown and described above the prefered structure in which the principles of the present invention have been incorporaated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In an agricultural implement adapted to be connected with a tractor having a power take-off shaft, and implement attaching means including an upper compression link and a pair of lower laterally spaced apart draft links, the forward ends of said links being connected with the tractor for both lateral and vertical swinging, the combination with an implement comprising a casing, a part carried by the casing within the latter and adapted to be driven by power from the power take-off shaft, means forming a generally forwardly diverging tunnel carried by said casing, a drive shaft connected at its rear portion with said driven part to drive the latter, said drive shaft being disposed within said tunnel and shiftable generally laterally and vertically therein, and means on the front end of said drive shaft to connect the latter to the tractor power take-off shaft, of hitch means comprising a pair of laterally spaced apart link-receiving means carried by said casing generally at each side of said tunnel means to receive the rear ends of said draft links, link-receiving means carried at the upper side and generally centrally of the tunnel means to receive the rear end of said upper link, said upper link-receiving means comprising a generally vertical mast yoke straddling the upper portion of said tunnel means and pivoted on said link-receiving means, brace means comprising a bifurcated member having rear portions fixed to the rear part of said casing generally rearwardly and at opposite sides of the rear portion of said tunnel means, and means movably connecting the forward portion of said brace means with said mast yoke and accommodating back and forth movement of said yoke.

2. For use with a tractor having an upper rearwardly extending rigid compression link pivoted at its front end to the tractor, a pair of laterally spaced apart lower rearwardly extending draft-transmitting links, a generally centrally located power take-off shaft at the rear of the tractor generally between said draft-transmitting links, and means connected with said pair of links to raise and lower the rear ends thereof, the improvement comprising an implement having frame means, a power driven operating unit carried by said frame means, a drive shaft therefor adapted to be connected with said power take-off shaft and carried by the generally central portion of said implement frame means, a pair of laterally spaced apart means at the forward part of the frame means to receive the rear ends of said draft-transmitting links and disposed at opposite sides of said drive shaft, means including a rear ground-engaging means to support the rear part of said frame means, a generally vertically disposed member pivotally connected at its lower end to said frame means and at its upper end having means adapted to pivotally receive the rear end of said upper link, said member having a portion straddling said drive shaft, slotted means carried at the upper portion of said generally vertically disposed member, brace means connected between the rear portion of said frame means and said slotted means, said brace means having a rear bifurcated portion straddling said drive shaft and an upper forward portion passing through the slot in said slotted means and the latter being thereby adapted in cooperation with said brace means to provide for a limited amount of relative swinging movement between said member and said frame means and a two-position stop means carried by said vertically disposed member and engageable in one position with said brace portion to limit the amount of permissive relative movement between said brace means and said vertically disposed member and adapted in the other position to prevent all movement of said brace means and said vertically disposed member.

3. For use with a tractor having an upper rearwardly extending rigid compression link pivoted at its front end to the tractor, a pair of laterally spaced apart lower rearwardly extending draft-transmitting links, and means connected with said pair of links to raise and lower the rear ends thereof, the improvement comprising an implement having frame means, a pair of laterally spaced apart means at the forward part of the frame means to receive the rear ends of said draft-transmitting links, whereby the forward part of the frame means is adapted to be supported through said pair of links and the associated tractor, means including a rear ground-engaging means to support the rear part of said frame means, a generally vertically disposed member pivotally connected at its lower end to said frame means and at its upper end having means adapted to pivotally receive the rear end of said upper link, a pair of spaced apart generally vertically disposed slotted plates fixed to the upper portion of said member, the slots in said plates extending in a generally fore-and-aft direction, an apertured web interconnecting said slotted plates, and brace means connected between the rear portion of said frame means and said slotted means, said brace means having a portion passing through the slots in said slotted plates, and a locking member insertible in the aperture in said web for controlling the amount of relative movement between said frame means and said pivoted member.

4. The invention set forth in claim 3, further characterized by said brace means comprising a bifurcated yoke member fixed at two laterally spaced apart points to the implement frame means and having a central bight portion passing through said slotted plates.

5. For use with a tractor having an upper rearwardly extending rigid compression link pivoted at its front end to the tractor, a pair of laterally spaced apart lower rearwardly extending draft-transmitting links, and means connected with said pair of links to raise and lower the rear ends thereof, the improvement that includes frame means,, a generally vertically disposed mast pivotally connected at its lower end to said frame means and at its upper end having means adapted to pivotally receive the rear end of said upper link, said last-mentioned means including a pair of laterally spaced apart generally vertically disposed plates fixed to the upper portion of said mast in laterally spaced apart relation, said plates having fore-and--aft extending slots rearwardly of the front ends of said plates, said front ends being apertured forwardly of said slots for pivotally receiving the rear end of said upper compression link, brace means connected between the rear portion of said frame means and said plates and including a bifurcated yoke member connected at two laterally spaced apart points to the implement frame means and having a central bight portion passing through said slotted plates, and means connectible with said plates for optionally locking said bight portion against movement in said slots.

6. The invention set forth in claim 5, further characterized by said mast comprising a yoke having lower laterally spaced apart ends, means including a pair of laterally spaced apart pins on said frame means to pivotally receive the lower ends of said yoke.

7. The invention set forth in claim 6, further characterized by said pins being extended so as to be adapted to receive the rear ends of said draft-transmitting links.

8. The invention set forth in claim 4, further characterized by said tractor including a power take-off shaft, a rotor carried by said frame means, an articulated drive shaft connecting said rotor with the power take-off shaft, a tunnel means carried by said frame means at least partially enclosing said drive shaft and disposed between the spaced apart portions of said bifurcated brace member, said generally vertically disposed member also including lower spaced apart lower portions pivoted to said frame means at opposite sides of said tunnel means.

References Cited in the file of this patent

UNITED STATES PATENTS

| | | |
|---|---|---|
| 2,379,469 | Bagam | July 3, 1945 |
| 2,460,847 | Schwarz | Feb. 8, 1949 |
| 2,564,355 | Danuser | Aug. 14, 1951 |
| 2,704,018 | Oehler et al. | Mar. 15, 1955 |
| 2,751,737 | Herod | June 26, 1956 |
| 2,815,631 | Northcote et al. | Dec. 10, 1957 |
| 2,818,269 | Northcote et al. | Dec. 31, 1957 |
| 2,828,968 | Engler | Apr. 1, 1958 |
| 2,868,307 | Schwegler | Jan. 13, 1959 |